United States Patent
Hsueh

(10) Patent No.: US 11,245,356 B1
(45) Date of Patent: Feb. 8, 2022

(54) WATER-PROOF CONNECTION STRUCTURE OF SOLAR POWER GENERATION DEVICE

(71) Applicant: Xiangzheng Energy Technology Ranch Co., Ltd., Tainan (TW)

(72) Inventor: Lien-Feng Hsueh, Tainan (TW)

(73) Assignee: XIANGZHENG ENERGY TECHNOLOGY RANCH CO., LTD., Tainan (TW)

( * ) Notice: Subject to any disclaimer, the term of this patent is extended or adjusted under 35 U.S.C. 154(b) by 0 days.

(21) Appl. No.: 16/951,663

(22) Filed: Nov. 18, 2020

(51) Int. Cl.
*H02S 20/22* (2014.01)
*H02S 30/10* (2014.01)

(52) U.S. Cl.
CPC .............. *H02S 30/10* (2014.12); *H02S 20/22* (2014.12)

(58) Field of Classification Search
None
See application file for complete search history.

(56) References Cited

U.S. PATENT DOCUMENTS

| | | | | |
|---|---|---|---|---|
| 6,672,018 B2* | 1/2004 | Shingleton | .............. | H02S 20/23 52/173.3 |
| 7,592,537 B1* | 9/2009 | West | .............. | H02S 20/23 136/251 |
| 9,496,819 B2* | 11/2016 | Hsueh | .............. | E04D 13/04 |

* cited by examiner

*Primary Examiner* — Jayne L Mershon
(74) *Attorney, Agent, or Firm* — Muncy, Geissler, Olds & Lowe, P.C.

(57) ABSTRACT

The invention provides a waterproof connection structure of a solar power generation device comprising a plurality of bearing units, a plurality of power generation units, a plurality of water blocking units, and a plurality of second fixing units. The bearing units respectively include two first grooves, a second groove positioned between the first grooves, and two bearing surfaces between the first grooves and the second groove. The power generation units respectively include a first fixing unit for accommodating a solar panel element, and each of the first fixing units is provided with a connection surface at a side facing to the bearing surfaces. The water blocking units are arranged between the connection surfaces and the corresponding bearing surfaces. The second fixing units are assembled on the second grooves. First containers for accommodating the water blocking units are respectively provided at the bearing surfaces corresponding to the connection surfaces.

10 Claims, 7 Drawing Sheets

WATER-PROOF CONNECTION STRUCTURE OF SOLAR POWER GENERATION DEVICE

FIELD OF THE INVENTION

The invention relates to a waterproof connection structure, in particular to a waterproof connection structure for a solar power generation device to prevent water from flowing into a building.

BACKGROUND OF THE INVENTION

In recent years, the international awareness of environmental protection has been gradually improved. How to reasonably use green energy has become an important issue of environmental protection. In the green energy technology, solar power generation has been paid attention because of its low cost and simple implementation. At present, the most common solar power generation mode is to install solar panels in an idle area of a building attic, and shed frames are set up on the attic to combine the solar panels as a wall of the building.

However, when it is raining, rainwater tends to leak from the gap between the solar panels and the shed frames to the ground in the building, especially in a heavy rainfall which is frequently encountered in the weather nowadays. The rainwater is not only heavy but also easy to flow into the building from the solar panels and the shed frames directly in a waterfall manner when the rainwater is not easy to release, causing many inconveniences, and improvement is necessary in the prior art.

SUMMARY OF THE INVENTION

The object of the present invention is to provide a waterproof connection structure of a solar power generation device, in which a water blocking unit is arranged between a power generation unit accommodating a solar panel element and a bearing unit carrying the power generation unit, so that rainwater is prevented from flowing into a building from a gap between the power generation unit and the bearing unit carrying the power generation unit, and the problem of easy water seepage of the conventional solar power generation device is solved.

In order to achieve the above object, the invention provides a waterproof connection structure of a solar power generation device, which comprises a plurality of bearing units, a plurality of power generation units, a plurality of water blocking units and a plurality of second fixing units. The plurality of bearing units are respectively provided with two first grooves which are concavely formed, a second groove which is concavely formed between the first grooves, two bearing surfaces adjacent between the first grooves and the second groove, and a plurality of channels being adjacent to the second groove. Each of the first grooves is provided with a first bottom, the second groove is provided with a second bottom, and the heights of the first bottom and the second bottom can be different or equal. Each of the plurality of power generation units comprises a first fixing unit and a solar panel element accommodated in the first fixing unit, a connection surface is provided at a side of each of the first fixing units facing to the bearing surfaces, wherein the connection surface of each of the first fixing units is respectively assembled on one of the bearing surfaces of adjacent two of the bearing units. The plurality of water blocking units are respectively arranged between each of the connection surfaces of the first fixing units and each of the bearing surfaces corresponding to the connection surfaces. The plurality of spacing units are arranged between two adjacent power generation units, and each of the plurality of spacing units is arranged on one of the bearing surfaces of adjacent two of the bearing units. The plurality of second fixing units are respectively provided with a plurality of locking pieces and are assembled in the second grooves, and the plurality of second fixing units are disposed to limit the plurality of power generation units on corresponding one of the first fixing units. A first container is provided at a position of the bearing surfaces corresponding to the connection surfaces respectively, and the plurality of water blocking units are respectively accommodated in a corresponding one of the first containers, or a second container is provided at a position of the connection surfaces corresponding to the bearing surfaces respectively; the plurality of water blocking units are respectively accommodated in the corresponding first container and the corresponding second container; and even the bearing surfaces are respectively provided with the first container, and the connection surfaces are respectively provided with the second container for accommodating the plurality of water blocking units.

According to the waterproof connection structure of the solar power generation device, the water blocking unit is arranged between the connection surface of the first fixing unit and the bearing surface of the bearing unit, so that rainwater is prevented from flowing into a building from the gap between the connection surface and the bearing surface, and the problem of water seepage of the conventional solar power generation device is solved.

DETAILED DESCRIPTION OF THE PREFERRED EMBODIMENTS

Figure 1:
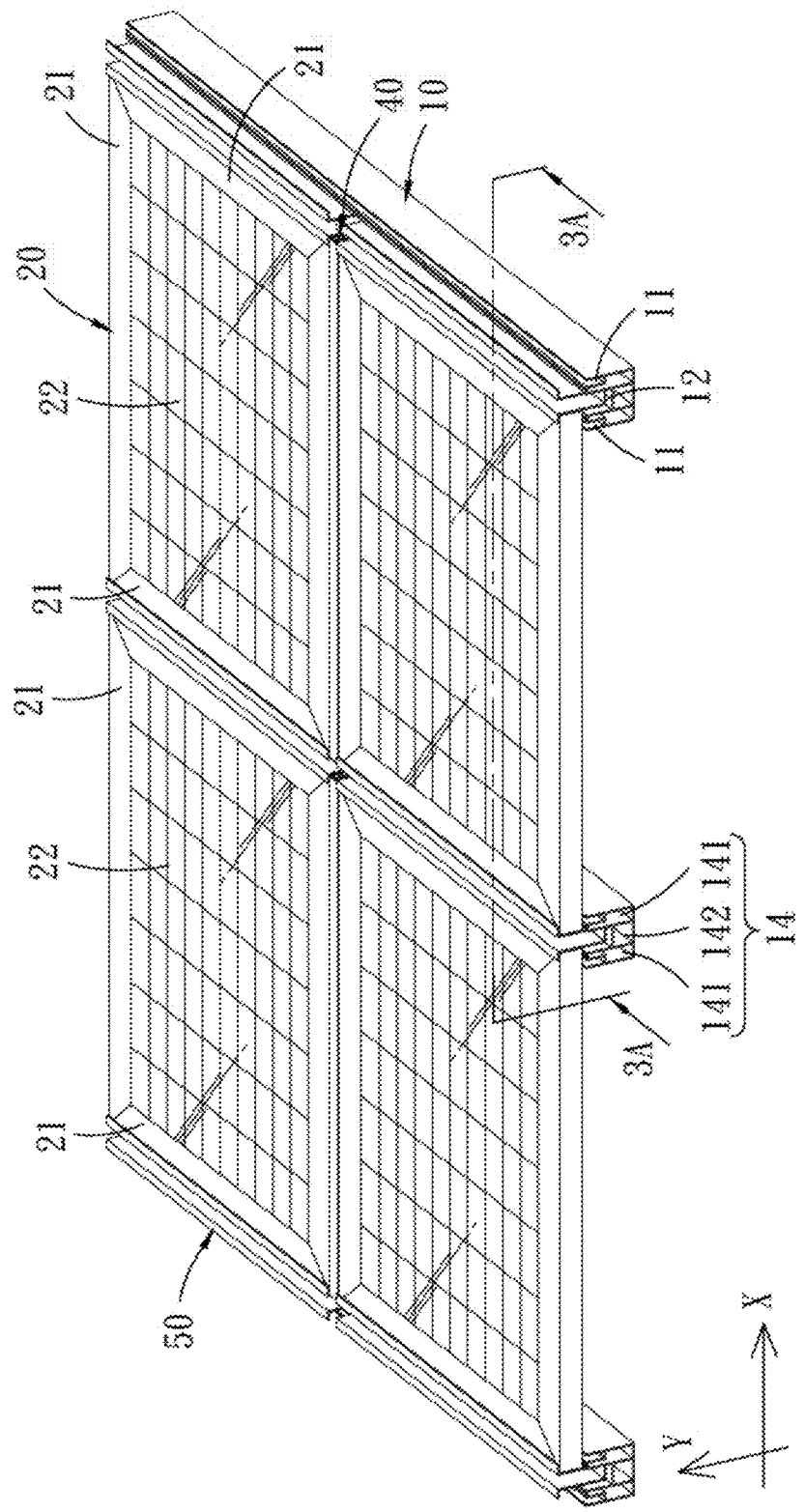
FIG. 1 is a three-dimensional combined view according to a first embodiment of the invention.
Figure 2:
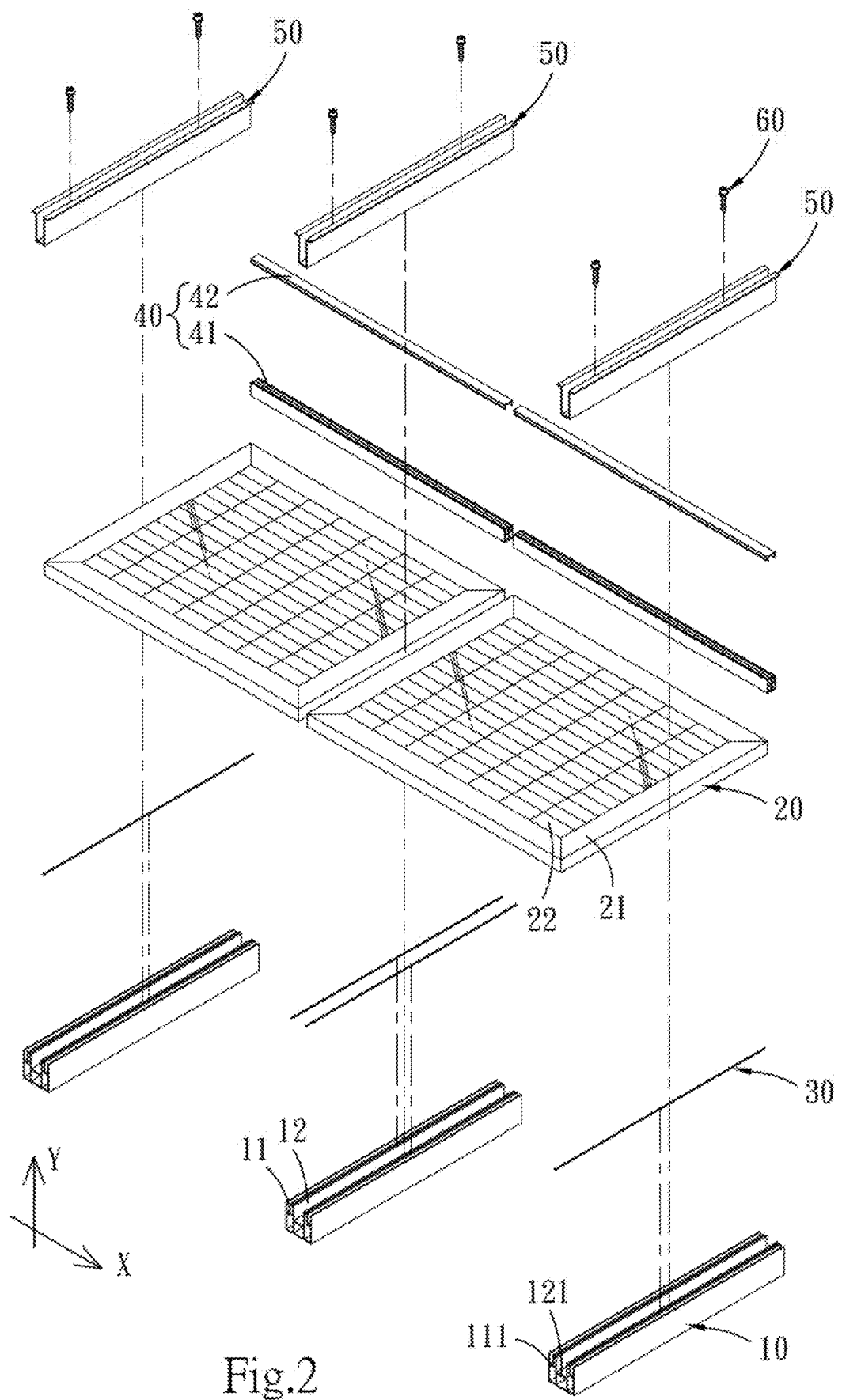
FIG. 2 is a partially exploded view according to the first embodiment of the present invention.

Referring to the technology of the present invention, as shown in FIG. 1, FIG. 2, FIG. 3, FIG. 4 and FIG. 5, the present invention provides a first embodiment of a waterproof connection structure of a solar power generation device, which mainly comprises a plurality of bearing units 10, a plurality of power generation units 20, a plurality of water blocking units 30, a plurality of spacing units 40, a plurality of second fixing units 50 and a plurality of locking pieces 60.

Each of the plurality of bearing units 10 includes two first grooves 11 concavely formed in a direction parallel to a first direction Y, a second groove 12 concavely formed between the first grooves 11, two bearing surfaces 13 respectively adjacent to the two first grooves 11 and the second groove 12, and a plurality of channels 14 arranged adjacent to the second groove 12 and parallel to the first direction Y. Each of the two first grooves 11 include a first bottom 111, and the second groove 12 include a second bottom 121. In the first embodiment, a height from the first bottom 111 of each of the two first grooves 11 to the two bearing surfaces 13 defines a first distance L1, a height from the second bottom 121 to the two bearing surfaces 13 defines a second distance L2, wherein the first distance L1 is shorter than, but not limited to, the second distance L2, i.e. the first distance L1 may be equal to, or longer than, the second distance L2.

Among the plurality of channels 14, which respectively adjacent to one of the two first grooves 11 and the second groove 12 are two first channels 141, and which positioned between the two first channels 141 and adjacent to the second groove 12 is a second channel 142.

Figure 3:
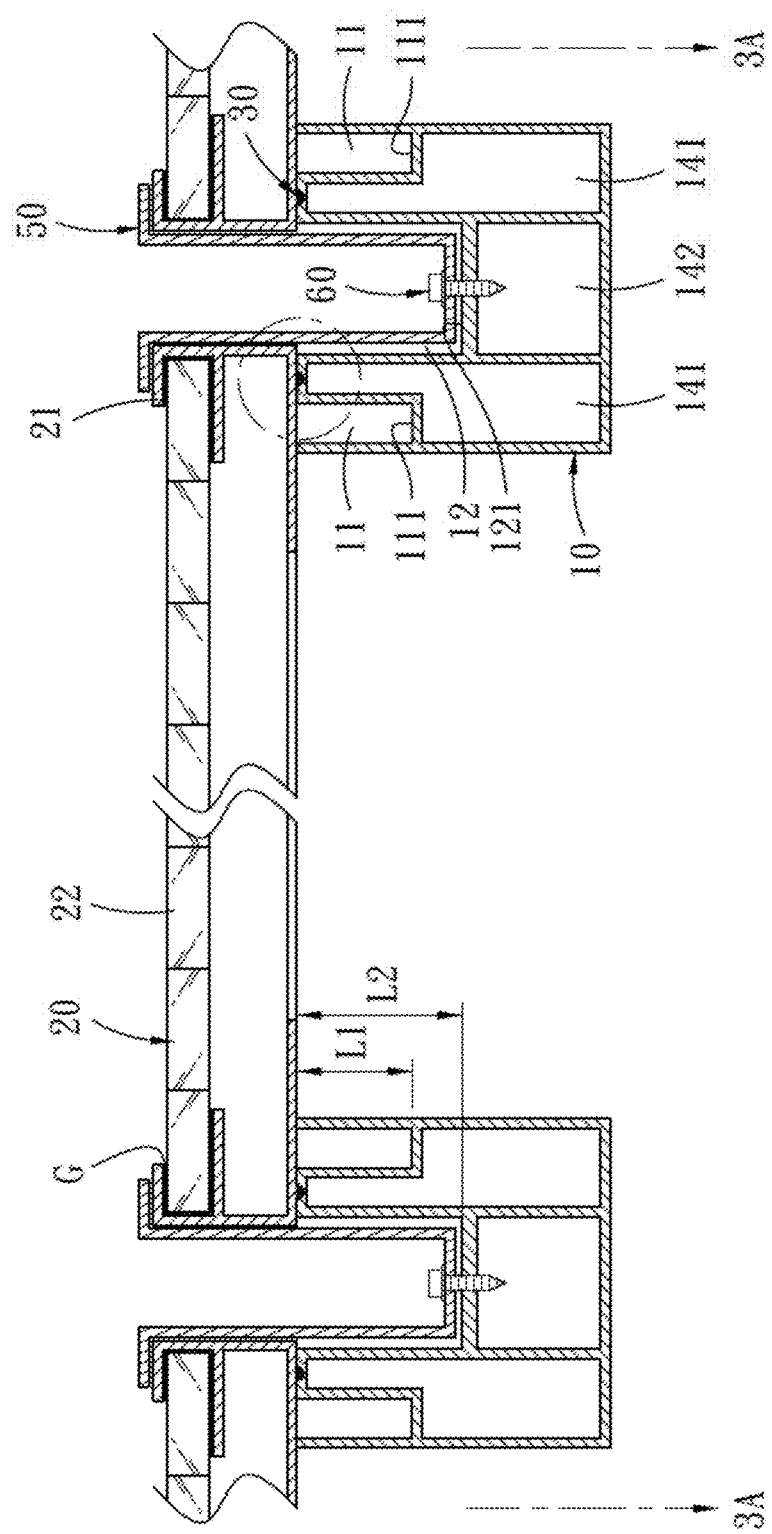
FIG. 3 is a partially cross-sectional view taken along line 3A-3A of FIG. 1 according to the present invention.
Figure 5:
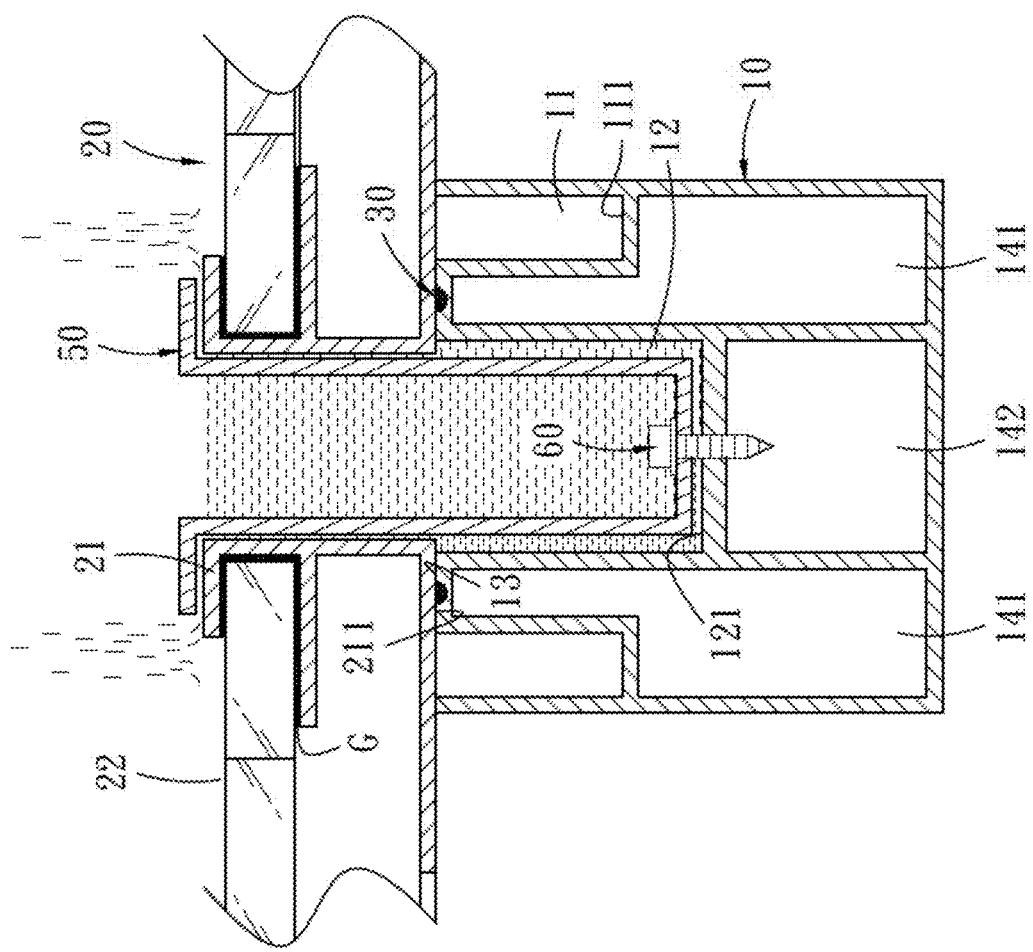
FIG. 5 is a waterproof usage view according to the first embodiment of the invention.

Each of the plurality of power generation units 20 comprises a first fixing unit 21 and a solar panel element 22 accommodated in the first fixing unit 21, wherein a connection surface 211 is provided at a side of the first fixing unit 21 facing to the bearing surface 13, and the connection surface 211 of the first fixing unit 21 is arranged on two of the bearing surfaces 13 of adjacent two of the plurality of bearing units 10. Referring to FIG. 3 and FIG. 5, the solar panel element 22 is combined with the first fixing unit 21 by an adhesive member G coated in the first fixing unit 21, and the adhesive member G provides a waterproof effect so that rainwater cannot flow into a building from a gap between the first fixing unit 21 and the solar panel element 22.

The plurality of water blocking units 30 are respectively arranged between each of the plurality of connection surfaces 211 of the plurality of first fixing units 21 and each of the bearing surfaces 13 corresponding to each of the connection surfaces 211. The plurality of water blocking units 30 are rubber strips, and a cross-sectional shape of the plurality of water blocking units 30 may be a circle, a square or a triangle. The water blocking unit 30 in the first embodiment is a rubber strip with a circular cross section shape, but is not limited to that.

The plurality of spacing units 40 are respectively arranged between two of the plurality of power generation units 20 adjacent to each other in a second direction X, and each of the plurality of spacing units 40 comprises a spacing body 41 and a waterproof connecting piece 42 covered on the spacing body 41. Each of the spacing bodies 41 is respectively provided on one of the two bearing surfaces 13 of the adjacent two of the plurality of bearing units 10. The second direction X is orthogonal to the first direction Y, and each of the spacing bodies 41 is provided with a plurality of compartments arranged along the second direction X.

Each of the plurality of second fixing units 50 is assembled on the second groove 12 to limit each of the plurality of power generation units 20 on the first fixing unit 21.

Figure 4A:
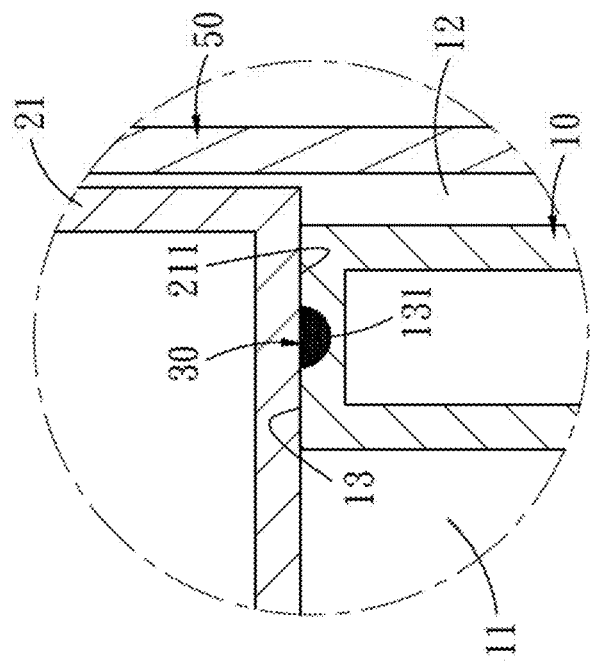
FIG. 4A is an enlarged view of a circled part of FIG. 3 before combining according to the present invention.
Figure 4B:
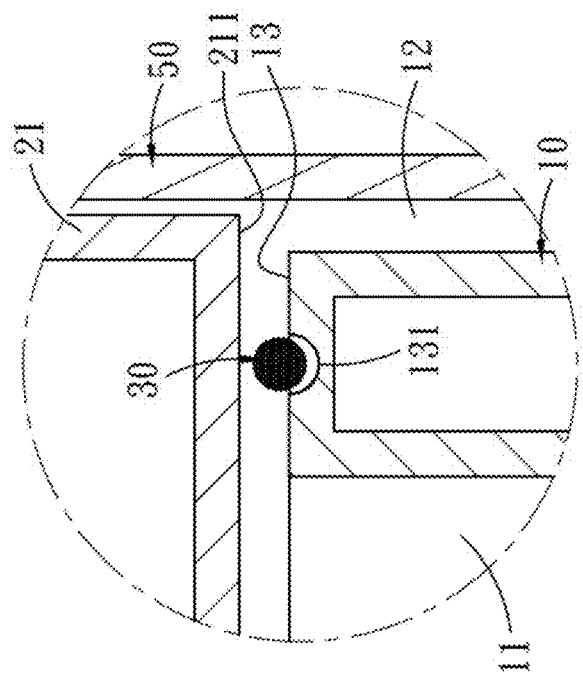
FIG. 4B is an enlarged view of a circled part of FIG. 3 after combining according to the present invention.

The plurality of locking pieces 60 lock and fix each of the plurality of second fixing units 50 to the second groove 12 of each of the plurality of bearing units 10. Two first containers 131 are respectively provided at a position of each of the two bearing surfaces 13 corresponding to the connection surface 211. As shown in FIGS. 4A and 4B, the plurality of water blocking units 30 are respectively accommodated in one of the two first containers 131. In the first embodiment, each of the plurality of second fixing units 50 is locked with three locking pieces 60 which are distributed substantially evenly over each of the plurality of second fixing unit 50, so that each of the plurality of second fixing unit 50 evenly applies force to the first fixing unit 21, and then the connection surface 211 of the first fixing unit 21 can evenly apply force to the plurality of water blocking units 30, causing that the plurality of water blocking units 30 can be tightly fitted in one of the two first containers 131. Load surfaces of the two first containers 131 maybe circle, square or triangle. The two first containers 131 of the first embodiment are a circular cross section, but are not limited thereto.

With reference to FIG. 1 and FIG. 5, it can be seen that when the building provided with the solar power generation device encounters heavy rain, rainwater are collected and flows out along a peripheral of each of the plurality of second fixing units 50 covered on the two first grooves 11, or rainwater flows out along a water collecting device provided on the solar power generation device to be discharged. The first fixing unit 21 of each of the plurality of power generation units 20 and the plurality of bearing units 10 are mostly made of metal materials. When the first fixing unit 21 is assembled on each of the plurality of bearing units 10, each of the two bearing surfaces 13 of the plurality of bearing units 10 is concavely provided with one of the first container 131 for accommodating one the plurality of water blocking units 30. The plurality of connection surfaces 211 of the plurality of first fixing units 21 may tightly press the plurality of water blocking units 30 in the plurality of first containers 131, so that the rainwater is blocked by the plurality of water blocking units 30, and is prevented from flowing into the building when the rainwater cannot permeate into the gap between each of the plurality of bearing units 10 and the plurality of first fixing units 21.

Figure 7A:
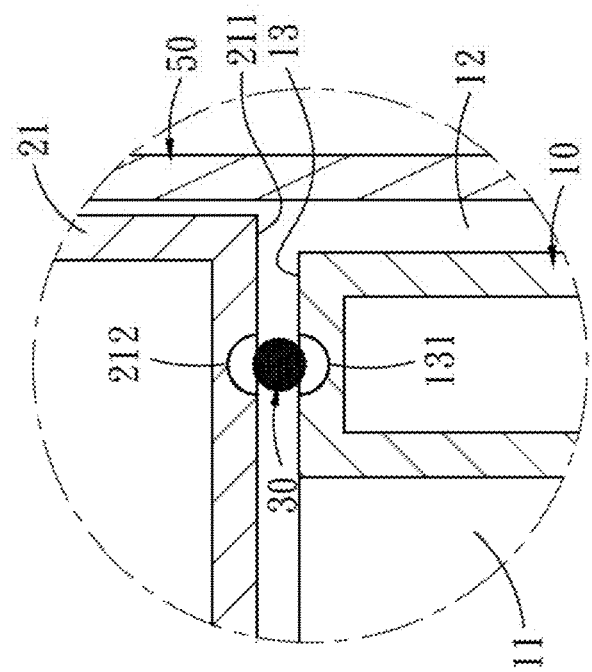
FIG. 7A is a partially cross-sectional view before a water blocking unit is combined with a first container according to a third embodiment of the invention.
Figure 6:
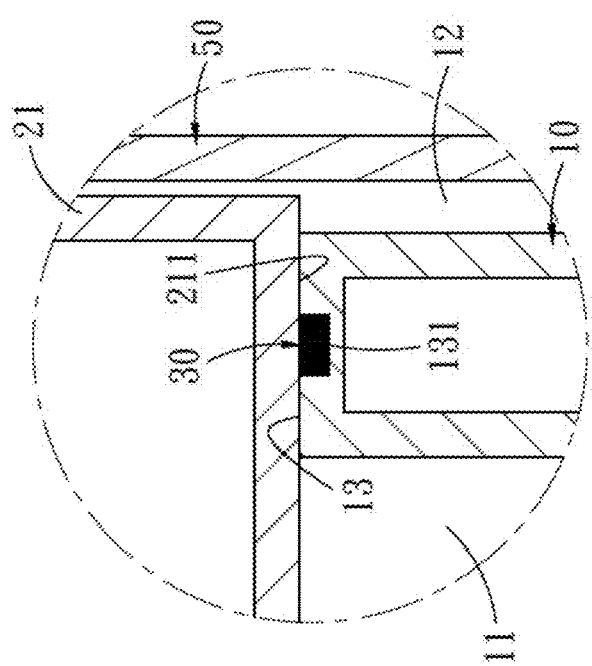
FIG. 6 is a partially cross-sectional view after a water blocking unit is combined with a first container according to a second embodiment of the invention.
Figure 8:
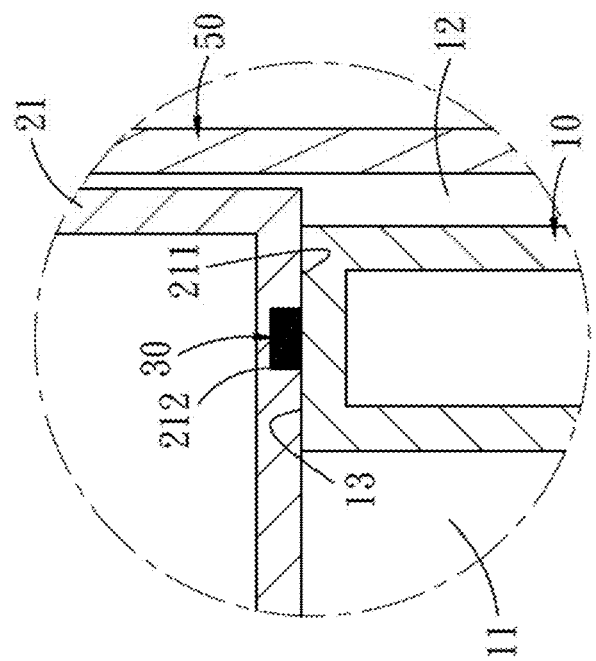
FIG. 8 is a partially cross-sectional view after the water blocking unit is combined with a second container according to a fourth embodiment of the invention.
Figure 7B:
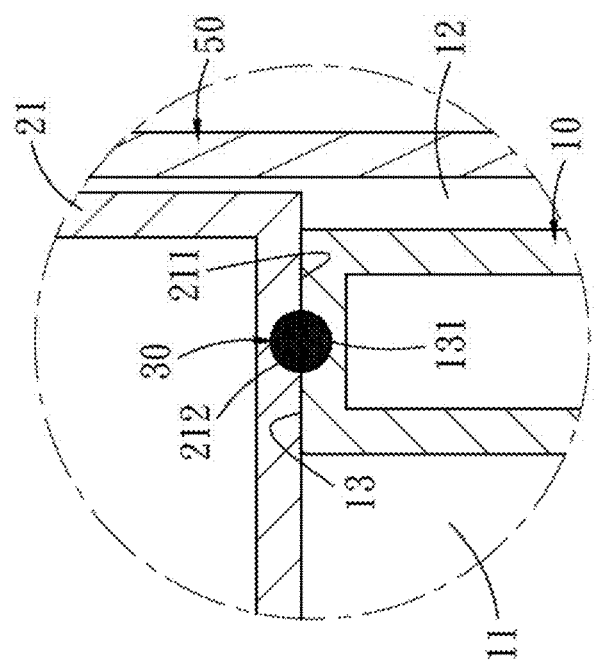
FIG. 7B is a partially cross-sectional view after the water blocking unit is combined with the first container according to the third embodiment of the invention.

Referring to FIG. 6, a second embodiment of the present invention includes the main structure and function which are the same as those of the first embodiment and will not be described in detail. The main difference between the second embodiment and the first embodiment is that the cross-sectional shape of the plurality of first containers 131 is a square, and the cross-sectional shape of the plurality of water blocking units 30 is also a square. Referring to FIGS. 7A and 7B, a third embodiment of the present invention includes the main structure and function which are the same as those of the first embodiment and will not be described in detail. The main difference between the third embodiment and the first embodiment is that a plurality of second containers 212 are respectively provided at a position of the plurality of connection surfaces 211 of the plurality of first fixing units 21 corresponding to the plurality of first containers 131, and each of the second containers 212 accommodates one of the plurality of water blocking units 30. Therefore, the plurality of water blocking units 30 are respectively accommodated in one of the plurality of first containers 131 and one of the plurality of second containers 212, so that the purpose of preventing water seepage is achieved. Referring to FIG. 8, a fourth embodiment of the present invention includes the main structure and function which are the same as those of the first embodiment and will not be described in detail. The main difference between the fourth embodiment and the first embodiment is that the two bearing surfaces 13 are not provided with the first containers 131, and only each of the connection surfaces 211 assembled on the two bearing surfaces 13 is provided with the second container 212, so that the plurality of water blocking units 30 is tightly fitted in one of the plurality of second containers 212, and the rainwater is prevented from permeating into the building through the gap between each of the plurality of connection surfaces 211 and each of the two bearing surfaces 13.

In view of the above, the present invention provides the waterproof connection structure of the solar power generation device in which the plurality of water blocking units 30 is arranged between one of the plurality of connection surfaces 211 of the plurality of first fixing units 21 and one of the two bearing surfaces 13 of the plurality of bearing units 10, so that the plurality of water blocking units 30 are accommodated in one of the plurality of first containers 131. Therefore, rainwater is prevented from flowing into the building from gap formed between each of the connection surfaces 211 of the plurality of first fixing units 21 and each of the two bearing surfaces 13 so as to solve the problem that the conventional solar power generation device is prone to water seepage caused by strong rainfall or water drainage not timely.

What is claimed is:

1. A waterproof connection structure of a solar power generation device, comprising:
   a plurality of bearing units, wherein each of the plurality of bearing units comprises two first grooves concavely formed parallel to a first direction, a second groove concavely formed between the first grooves, and two bearing surfaces respectively adjacent between the first grooves and the second groove, each of the first grooves comprises a first bottom, and the second groove comprises a second bottom;
   a plurality of power generation units, wherein each of the plurality of power generation units comprises a first fixing unit and a solar panel element accommodated in the first fixing unit, a connection surface is provided at a side of each of the first fixing units facing to the two bearing surfaces, wherein the connection surface of each of the first fixing units is respectively assembled on one of the two bearing surfaces of adjacent two of the bearing units;
   a plurality of water blocking units, respectively arranged between each of the connection surfaces of the first fixing units and each of the two bearing surfaces corresponding to the connection surfaces;
   a plurality of spacing units, arranged between adjacent two of power generation units in a second direction, wherein each of the plurality of spacing units is arranged on one of the two bearing surfaces of adjacent two of the bearing units, and the second direction is orthogonal to the first direction; and
   a plurality of second fixing units, respectively assembled on the second grooves, wherein the plurality of second fixing units are disposed to limit the plurality of power generation units on corresponding one of the first fixing units;
   wherein, a position of the two bearing surfaces corresponding to the connection surfaces is provided with a first container respectively, and the plurality of water blocking units are respectively accommodated in corresponding one of the first containers.

2. The waterproof connection structure of the solar power generation device of claim 1, wherein a height from the first bottom of each of the two first grooves to the two bearing surfaces defines a first distance, a height from the second bottom to the two bearing surfaces defines a second distance, and the first distance is shorter than the second distance.

3. The waterproof connection structure of the solar power generation device of claim 1, wherein the plurality of bearing units are further provided with a plurality of channels respectively, the channels is adjacent to the second groove and arranged parallel to the first direction.

4. The waterproof connection structure of the solar power generation device of claim 3, wherein among the plurality of channels, which respectively adjacent to one of the two first grooves and the second groove are two first channels, and which positioned between the two first channels and adjacent to the second groove is a second channel.

5. The waterproof connection structure of the solar power generation device of claim 1, wherein a second container is further provided at one of the connection surfaces of the first fixing units corresponding to the first containers, and each of the second containers accommodates one of the plurality of water blocking units.

6. The waterproof connection structure of the solar power generation device of claim 1, wherein a cross-sectional shape of the plurality of water blocking units is a circle, a square or a triangle, and the plurality of water blocking units are rubber strips.

7. The waterproof connection structure of the solar power generation device of claim 1, wherein load surfaces of the first containers are a circle, a square or a triangle.

8. The waterproof connection structure of the solar power generation device of claim 1, wherein the plurality of second fixing units are further locked with a plurality of locking pieces to be fixed to the second groove of a corresponding one of the plurality of bearing units.

9. The waterproof connection structure of claim 1, wherein each of the plurality of spacing units comprises a spacing body and a waterproof connecting piece covered on the spacing body.

10. A waterproof connection structure of a solar power generation device, comprising:
   a plurality of bearing units, wherein each of the plurality of bearing units comprises two first grooves concavely formed parallel to a first direction, a second groove concavely formed between the first grooves, and two bearing surfaces respectively adjacent between the first grooves and the second groove, each of the first grooves comprises a first bottom, and the second groove comprises a second bottom;
   a plurality of power generation units, wherein each of the plurality of power generation units comprises a first fixing unit and a solar panel element accommodated in the first fixing unit, a connection surface is provided at a side of each of the solar panel elements facing to the bearing surfaces, wherein the connection surface of each of the first fixing units is respectively assembled on one of the bearing surfaces of adjacent two of the bearing units; and
   a plurality of water blocking units respectively arranged between the connection surface of each of the first fixing units and the bearing surfaces corresponding to the connection surface;
   a plurality of spacing units arranged between adjacent two of power generation units in a second direction, wherein each of the plurality of spacing units is arranged on one of the bearing surfaces of adjacent two of the bearing units, and the second direction is orthogonal to the first direction; and
   a plurality of second fixing units respectively assembled on the second grooves, wherein the plurality of second fixing units are disposed to limit the plurality of power generation units on corresponding one of the first fixing units;

wherein, a position of the connection surfaces corresponding to the bearing surfaces is provided with a second container respectively, and the plurality of water blocking units are respectively accommodated in corresponding one of the second containers.

\* \* \* \* \*